United States Patent
Walden

[11] Patent Number: 5,887,349
[45] Date of Patent: *Mar. 30, 1999

[54] BLADE ASSEMBLY WITH SELF-BRAKING FLAIL CUTTING ELEMENTS

[75] Inventor: Jack G. Walden, Wheatland, Okla.

[73] Assignee: Lebever Co., Inc., Oklahoma City, Okla.

[ * ] Notice: The term of this patent shall not extend beyond the expiration date of Pat. No. 5,722,172.

[21] Appl. No.: 790,184

[22] Filed: Jan. 29, 1997

Related U.S. Application Data

[63] Continuation-in-part of Ser. No. 598,755, Mar. 8, 1996, Pat. No. 5,722,172.

[51] Int. Cl.⁶ .................................................. A01D 50/00
[52] U.S. Cl. .............................................. 30/347; 30/296
[58] Field of Search ...................... 30/276, 347; 56/12.5, 56/12.7, 295

[56] References Cited

U.S. PATENT DOCUMENTS

| | | | |
|---|---|---|---|
| D. 280,903 | 10/1985 | Barbula | D15/16 |
| 3,662,529 | 5/1972 | Glunk et al. | 56/295 |
| 4,107,841 | 8/1978 | Rebhun | 30/276 |
| 4,148,141 | 4/1979 | Hoff | 30/276 |
| 4,631,828 | 12/1986 | Burnett | 30/276 |
| 4,856,194 | 8/1989 | Lee | 30/276 |
| 5,430,943 | 7/1995 | Lee | 30/347 |
| 5,617,636 | 4/1997 | Taggett et al. | 30/276 |

*Primary Examiner*—Douglas D. Watts
*Attorney, Agent, or Firm*—Dunlap, Codding & Rogers, P.C.

[57] ABSTRACT

A cutting attachment for a rotary cutting apparatus wherein the cutting attachment has a substantially rigid body and a plurality of cutting members. Each cutting member has a blade portion and a head portion. An aperture extends through the head portion of the cutting member for connecting the cutting members to the substantially rigid body of the cutting attachment such that, in a connected position, the blade portion of the cutting member extends outwardly from the substantially rigid body of the cutting attachment. The cutting attachment further includes a brake assembly for reducing the speed of rotation of the cutting members when the cutting members are rotated in response to actuation of the rotary cutting apparatus.

23 Claims, 7 Drawing Sheets

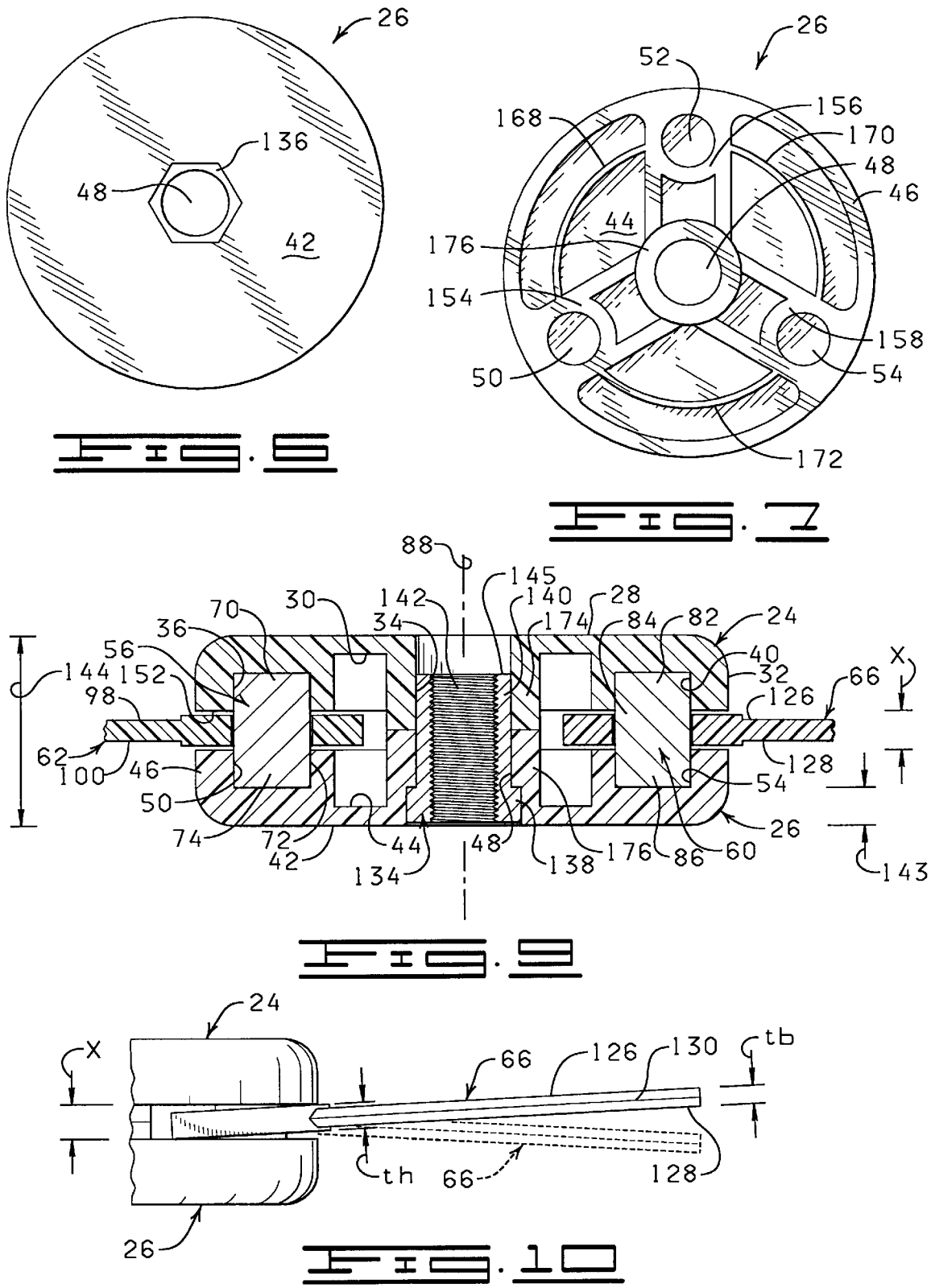

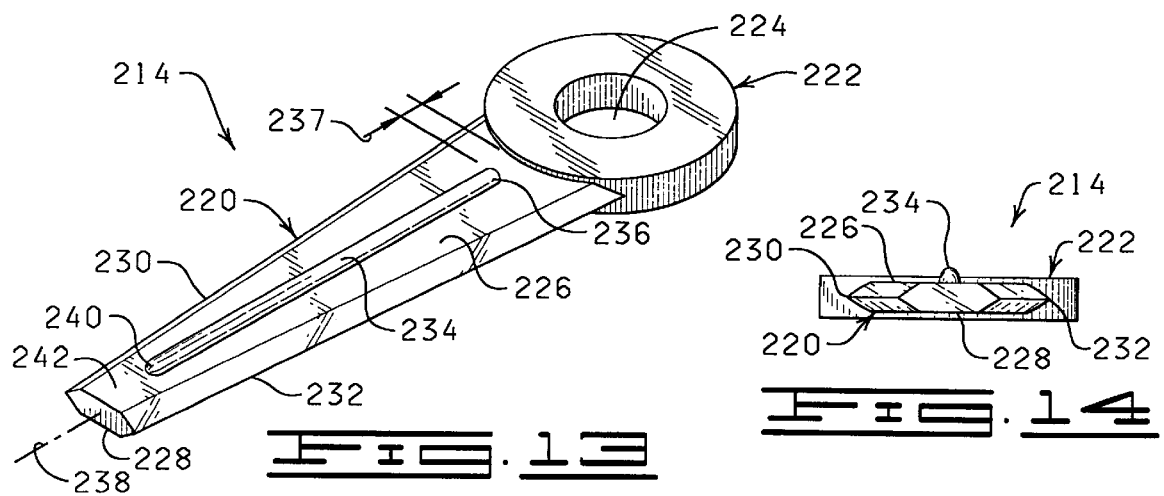
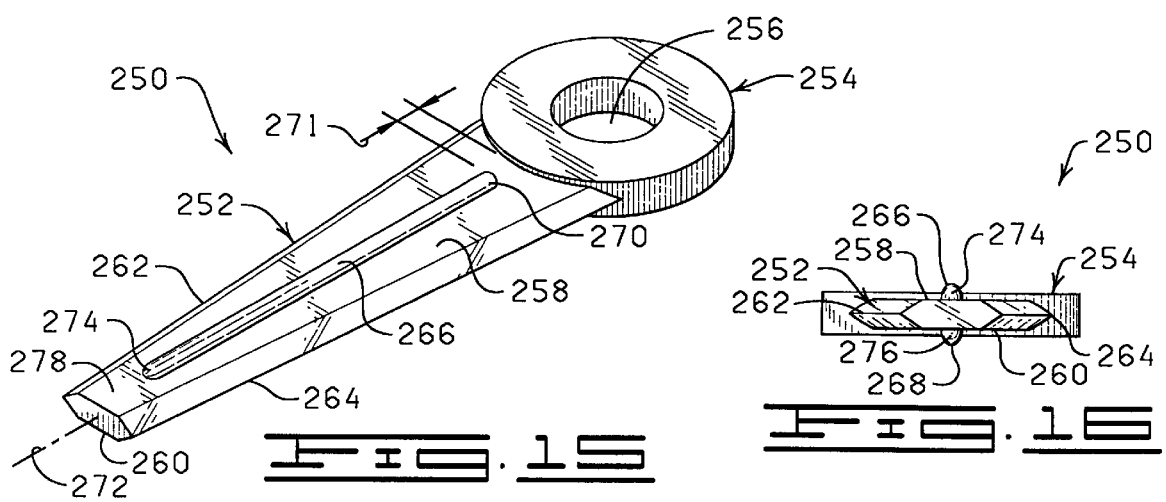
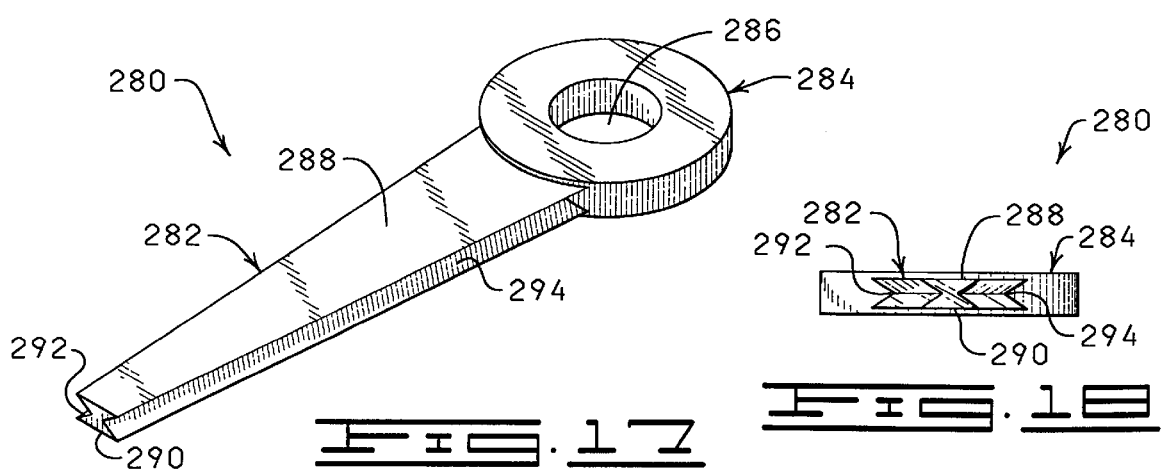

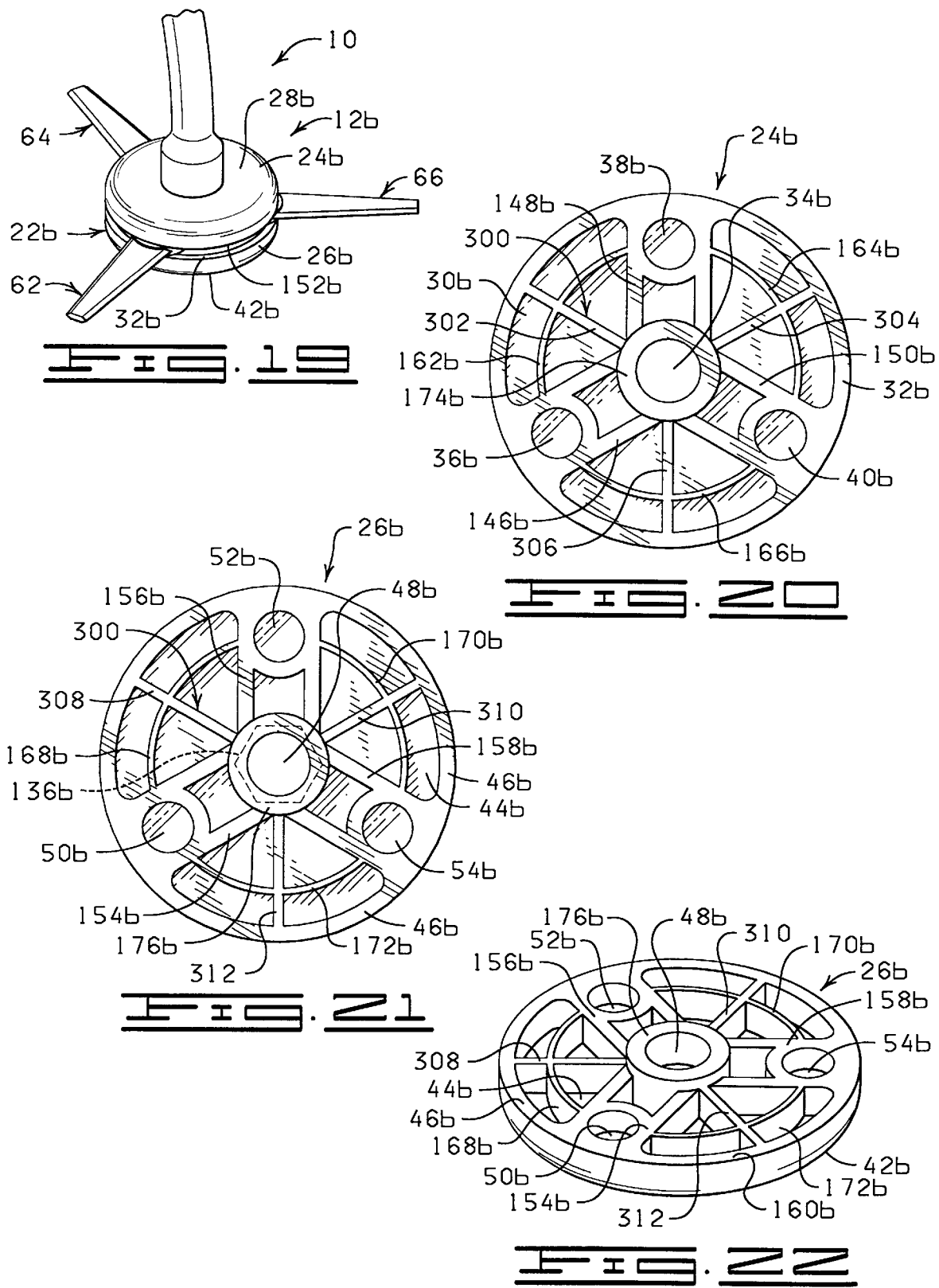

5,887,349

BLADE ASSEMBLY WITH SELF-BRAKING FLAIL CUTTING ELEMENTS

CROSS REFERENCE TO RELATED APPLICATIONS

This application is a continuation-in-part of U.S. application Ser. No. 08/598,755, filed Mar. 8, 1996, entitled "CUTTING ATTACHMENT FOR ROTARY CUTTING APPARATUS", now U.S. Pat. No. 5,722,172.

STATEMENT REGARDING FEDERALLY SPONSORED RESEARCH OR DEVELOPMENT

Not Applicable

BACKGROUND OF THE INVENTION

1. Field of the Invention

The present invention relates generally to rotary cutting apparatus and more particularly, but not by way of limitation, to cutting attachments for rotary cutting apparatus.

2. Brief Description of the Related Art

The prior art is replete with various types of rotary cutting apparatus and cutting attachments for such rotary cutting apparatus. However, the prior art cutting attachments for such rotary cutting apparatus have a number of disadvantages. For example, many of the cutting attachments have inadequate skid plates or have cutting blades which wear out quickly and which are ineffective in cutting various types of vegetation, including grasses, weeds and other materials. In addition, many of the cutting attachments are not self-cleaning and collect debris during operation which adversely affects the efficiency of the rotary cutting apparatus.

Other cutting attachments which are formed with skid plates and/or are configured to be self-cleaning are expensive to manufacture, difficult to attach to various types of rotary cutting apparatus, or require special hand tools to attach and remove the cutting attachment from the rotary cutting apparatus. Further, the prior art cutting attachments are generally not interchangeable between rotary cutting apparatus made by various manufacturers.

Therefore, a need exists for an improved cutting attachment for rotary cutting apparatus which overcomes the afore-mentioned problems of the prior art cutting attachments, and which enables one to attach such cutting attachment to various rotary cutting apparatus without the requirement of hand tools or modification of the rotary cutting apparatus. It is to such a cutting attachment that the present invention is directed.

BRIEF SUMMARY OF THE INVENTION

According to the present invention, a cutting attachment for a rotary cutting apparatus is provided which can be easily and quickly attached and removed from a variety of commercially available rotary cutting apparatus without the use of tools or modification of such rotary cutting apparatus. Broadly, the cutting attachment is provided with a first body member, a second body member and a plurality of pins spaced an equidistance apart for connecting the first body member to the second body member to form a rigid body wherein at least a portion of the first and second body members are spatially disposed a distance (x) apart, each of the pins having a bearing surface substantially corresponding in length to the distance (x) between the first and second body members. The cutting attachment further includes a connector for connecting the rigid body to a shaft or arbor of the rotating cutting apparatus and a plurality of cutting members connected to the pins such that the cutting members are rotatable about the pins and axially movable along the bearing surface of the pins to effect cooling of the bearing surface of the pins and thereby enhance the life of the cutting members by reducing heat and friction between the pins and the cutting members due to movement of the cutting members about and along the bearing surface of the pins.

Each of the cutting members is characterized as having a blade portion and a head portion through which an aperture extends and through which one of the pins extends for connecting the cutting members to the pins and thus to the first and second body members of the rigid body. Each of the pins is characterized as having a first end, a medial portion which defines the bearing surface, and a second end. The pins have a pin length (pl) and a pin diameter (pd) such that, upon disposing one of the pins through the aperture in the head portion of one of the cutting members and connecting the first end of the pins to the first body member and the second end of the pins to the second body member, the cutting members are spatially disposed in the space or distance (x) between the first and second body members such that the bearing surface of each of the pins is exposed in such distance (x).

The blade portion of each of the cutting members has a thickness (tb) and the head portion of each of the cutting members has a thickness (th), each of which is less than the distance (x) between the first and second body members; and the apertures in the head portions of the cutting members have a diameter (ad) greater than the pin diameter (pd) of the pins so that the cutting members are permitted to rotate about and axially move along the bearing surface of the pins during operation of the rotary cutting apparatus and thereby effect cooling of the bearing surface of the pins and thus substantially reduce enlargement of the apertures in the head portions of the cutting members.

In one embodiment, the cutting attachment for a rotary cutting apparatus is further provided with a braking assembly for reducing the speed of rotation of the cutting members when the cutting members are rotated in response to actuation of the rotary cutting apparatus. The braking assembly is disposed on the blade portion of the cutting members; or the braking assembly is disposed on the first body member and/or the second body member of the rigid body of the cutting attachment; or the braking assembly is disposed on the blade portion of the cutting members and on the first body member and/or the second body member of the rigid body of the cutting attachment.

An object of the present invention is to provide an improved cutting attachment for a rotating cutting apparatus.

Another object of the present invention, while achieving the before-stated object, is to provide a cutting attachment which can be used on various models of rotary cutting apparatus without substantial modification of the cutting attachment or the rotary cutting apparatus and wherein the cutting blades are movable along a bearing surface of the pins to effect cooling of the bearing surface and thereby enhance the useful life of the cutting blades without interfering with the cutting efficiency of the cutting blades.

Another object of the present invention, while achieving each of the before-stated objects, is to provide an improved cutting attachment which is economical to manufacture and which can be readily attached to and removed from a rotary cutting apparatus without the need of hand tools.

Yet another object of the present invention, while achieving each of the before-stated objects, is to provide an improved cutting attachment wherein the cutting blades can readily be replaced by the user at the location of use without the need of special tools or fear of improper installation.

Other objects, advantages and features of the present invention will become apparent to those skilled in the art from a reading of the following detailed description and appended claims.

BRIEF DESCRIPTION OF THE DRAWINGS

FIG. 6 is a plan view of a first side of a second body member of the rigid body of the cutting attachment of the present invention.

FIG. 7 is a plan view of a second side of the second body member of the rigid body of the cutting attachment of the present invention.

FIG. 9 is a cross-sectional view of the cutting attachment of FIG. 3 taken along lines 9—9.

FIG. 10 is a partially broken, side elevational view of the cutting attachment of the present invention depicting vertical movement of a cutting member along a bearing surface of a pin.

FIG. 13 is a perspective view of one of the cutting members of the cutting attachment of FIG. 12.

FIG. 14 is an elevational end view of the cutting member of FIG. 13.

FIG. 15 is a perspective view of another embodiment of a cutting member having a braking assembly wherein the braking assembly is disposed along a portion of an upper surface and a lower surface of a blade portion of the cutting member.

FIG. 16 is an elevational end view of the cutting member of FIG. 15.

FIG. 17 is a perspective view of another embodiment of a cutting member having a braking assembly wherein the braking assembly is disposed along a leading edge and a trailing edge of a blade portion of the cutting member.

FIG. 18 is an elevational end view of the cutting member of FIG. 17.

FIG. 19 is a fragmental pictorial representation of a rotary cutting apparatus having another embodiment of a cutting attachment of the present invention connected thereto wherein the cutting attachment is provided with a braking assembly.

FIG. 20 is a plan view of a second side of a first body member of a rigid body of the cutting attachment of FIG. 19.

FIG. 21 is a plan view of a second side of the second body member of the rigid body of the cutting attachment of FIG. 19.

FIG. 22 is a perspective view of the second body member of the rigid body of the cutting attachment of FIG. 19 as viewed from the second side thereof.

DETAILED DESCRIPTION OF THE INVENTION

Figure 1:
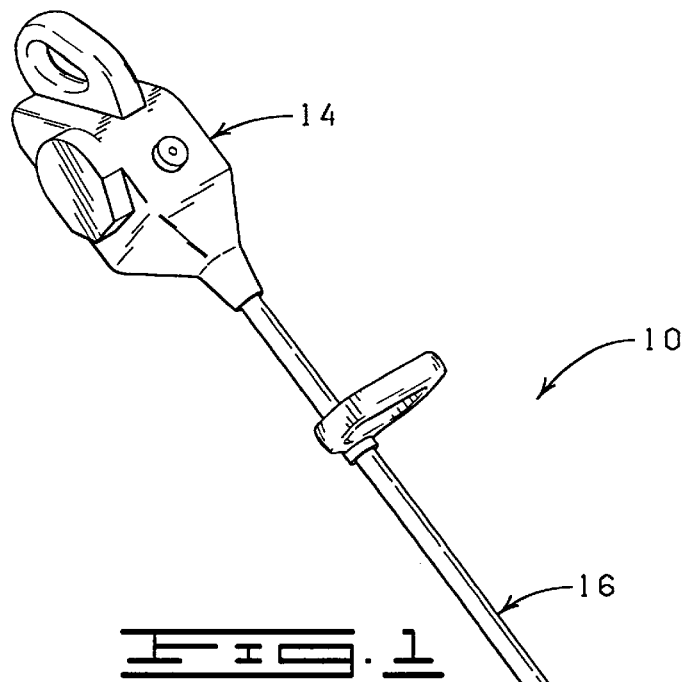
FIG. 1 is a pictorial representation of a rotary cutting apparatus having a cutting attachment of the present invention connected thereto.
Figure 2:
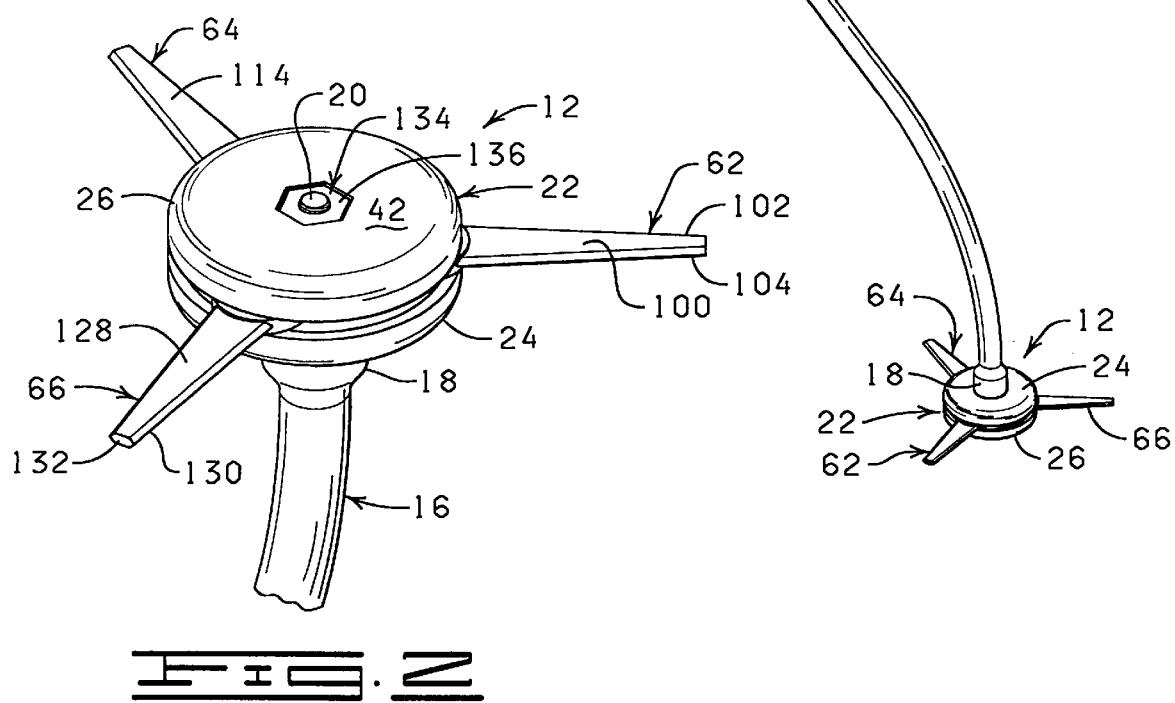
FIG. 2 is a perspective view of a lower side of the cutting attachment of the present invention connected to a threaded spindle or arbor of a rotary cutting apparatus.

Referring now to the drawings, and more particularly to FIG. 1, a rotary cutting apparatus 10 is illustrated having a cutting attachment 12 of the present invention mounted thereon. The rotary cutting apparatus 10 is provided with a motor 14 and a frame shaft tube 16. The frame shaft tube 16 extends forward and downward from the motor 14, through a bend, to a generally lower vertical end 18 on which the cutting attachment 12 is mounted. The cutting attachment 12 is connected to a drive shaft (not shown) housed within the frame shaft tube 16 via a threaded arbor or spindle 20 (FIG. 2) of the drive shaft of the rotary cutting apparatus 10. If desired, the rotary cutting apparatus 10 can also be provided with a debris shield (not shown) which extends about a portion of the cutting attachment 12.

Rotary cutting apparatus, such as the rotary cutting apparatus 10, are well known in the art and are commercially available. Thus, no further description of the rotary cutting apparatus 10 or its operation is believed necessary to enable one skilled in the art to understand the cutting attachment 12 of the present invention.

Figure 5:
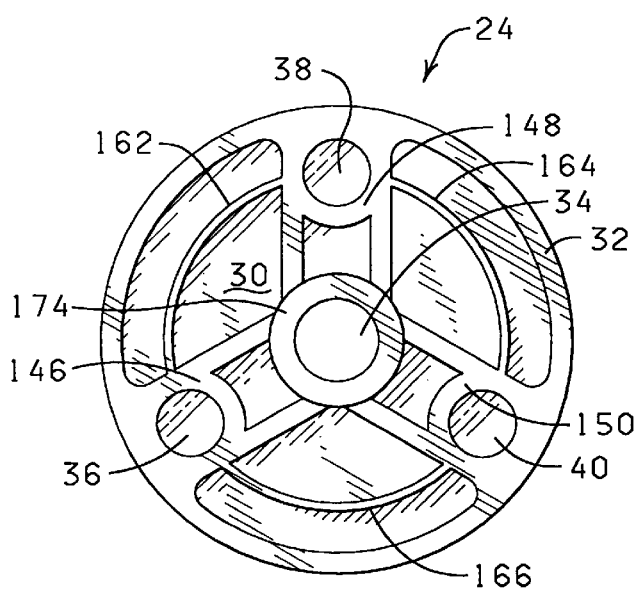
FIG. 5 is a plan view of a second side of the first body member of the rigid body of the cutting attachment of the present invention.

Referring more specifically to FIGS. 2–9, the cutting attachment 12 of the present invention is provided with a rigid body 22 formed from a first body member 24 and a spatially disposed second body member 26. The first body member 24 is provided with a substantially planar first side 28, a second side 30 and a generally vertical sidewall 32. A centrally disposed opening 34 is formed in the first body member 24 so as to extend between the substantially planar first side 28 and the second side 30 of the first body member 24. The second side 30 of the first body member 24 is provided with a plurality of pin receiving holes 36, 38 and 40 formed therein which are spaced an equidistance apart and disposed in close proximity to an outer peripheral surface of the second side 30 of the first body member 24 substantially as shown in FIG. 5.

The second body member 26, which is substantially a mirror image of the first body member 24 with the exception noted herein, is provided with a substantially planar first side 42, a second side 44 and a generally vertical sidewall 46. A centrally disposed opening 48 extends between the first side 42 and the second side 44 of the second body member 26 such that, in a connected position of the first and second body members 24 and 26 as will be described in detail hereinafter, the centrally disposed opening 48 in the second body member 26 is axially aligned with the centrally disposed opening 34 in the first body member 24. The second side 44 of the second body member 26 is provided with a plurality of pin receiving holes 50, 52 and 54 spaced an equidistance apart and disposed in close proximity to an outer peripheral surface of the second side 44 of the second body member 26 such that, in an assembled position, each of the pin receiving holes 50, 52 and 54 in the second side 44 of the second body member 26 is alignable with one of the pin receiving holes 36, 38 and 40 in the second side 30 of the first body member 24.

The cutting attachment 12 further includes a plurality of pins 56, 58 and 60 for rotatably connecting a plurality of radially extending cutting members 62, 64 and 66 to the rigid body 22 and for connecting the first and second body members 24 and 26 to form the rigid body 22 whereby at least a portion of the first and second body members 24 and 26 are spatially disposed a distance (x) so that the cutting members 62, 64 and 66 are rotatable about and axially movable along the pins 56, 58 and 60 throughout the distance (x) provided between the first and second body members 24 and 26 in a manner to be more fully described hereinafter. It should be noted that while the cutting attachment 12 is depicted as having three radially extending cutting members 62, 64 and 66 rotatably connected between the first and second body members 24 and 26 of the rigid body 22 by the pins 56, 58 and 60, two, four or more of the radially extending cutting members can be rotatably connected between the first and second body members 24 and 26 of the rigid body 22 without departing from the inventive concept disclosed herein.

The pin 56 is an elongated, cylindrical-shaped member having a first end 70, a medial portion 72 defining a bearing surface, and a second end 74; the pin 58 is an elongated, cylindrical-shaped member having a first end 76, a medial portion 78 defining a bearing surface, and a second end 80; and the pin 60 is an elongated, cylindrical-shaped member having a first end 82, a medial portion 84 defining a bearing surface, and a second end 86. Thus, upon disposing the first end 70 of the pin 56 in the pin receiving hole 36 in the second side 30 of the first body member 24 and disposing the second end 74 of the pin 56 in the pin receiving hole 50 in the second side 44 of the second body member 26, the first end 76 of the pin 58 in the pin receiving hole 38 in the second side 30 of the first body member 24 and the second end 80 of the pin 58 in the pin receiving hole 52 in the second side 44 of the second body member 26 and the first end 82 of the pin 60 in the pin receiving hole 40 formed in the second side 30 of the first body member 24 and the second end 86 of the pin 60 in the pin receiving hole 54 formed in the second side 44 of the second body member 26, the pins 56, 58 and 60 cooperate to secure the first body member 24 to the second body member 26 to form the rigid body 22 while maintaining at least a portion of the first body member 24 in a spatial relationship with the second body member 26 so that at least a portion of the first body member 24 is disposed the predetermined distance (x) from the second body member 26.

Each of the pins 56, 58 and 60 have a pin length (pl) and a pin diameter (pd). The pin length (pl) of the pins 56, 58 and 60 is such that, in a connected position, the bearing surfaces defined by the medial portions 72, 78 and 84 of the pins 56, 58 and 60 are exposed in the space formed between the first and second body members 24 and 26 of the rigid body 22 substantially as shown in FIGS. 9 and 10.

Each of the cutting members 62, 64 and 66 is connected to one of the pins 56, 58 and 60 so that when the rigid body 22 of the cutting attachment 12 rotates about axis 88 (FIG. 9) the cutting members are disposed in a vegetation cutting position. The cutting members 62, 64 and 66 are formed of a high-impact plastic or similar composition and each of the cutting members 62, 64 and 66 is movable between an outwardly cutting position (FIGS. 1–3) and a deflected, out of the way position when one of the cutting members, such as cutting member 62 strikes an object, such as a rock 90 (FIG. 11), during rotation of the cutting attachment 12 so that the cutting members 62, 64 and 66 will not be damaged.

Figure 3:
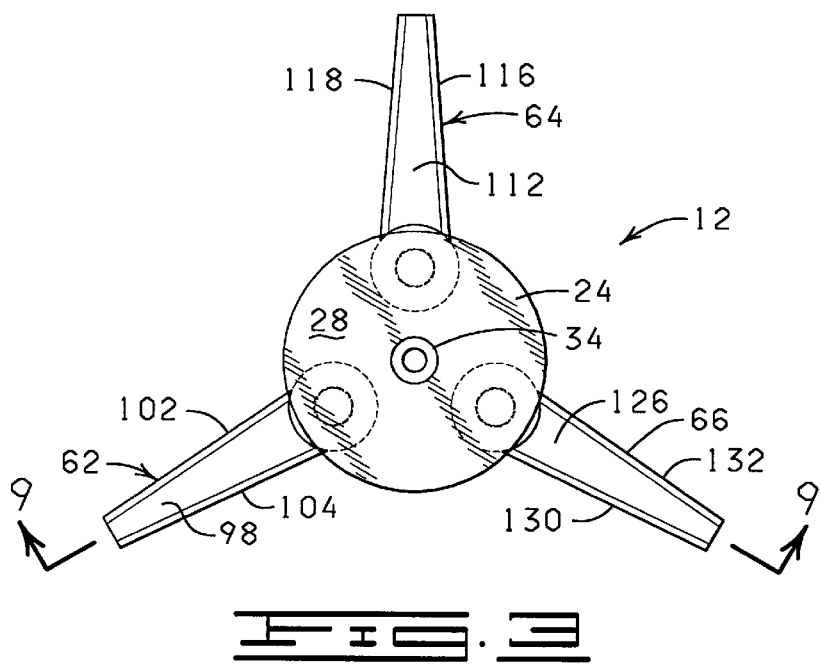
FIG. 3 is a top plan view of the cutting attachment of the present invention.
Figure 4:
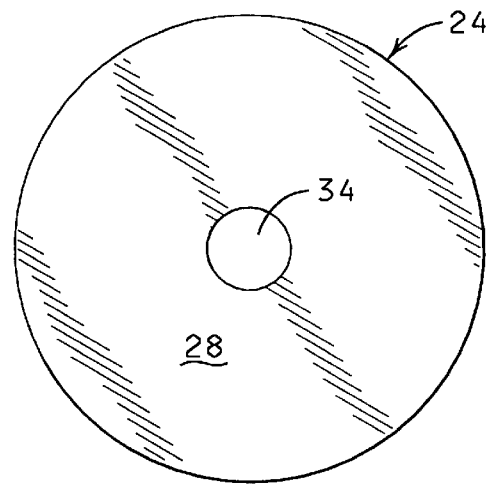
FIG. 4 is a plan view of a first side of a first body member of a rigid body of the cutting attachment of the present invention.

The cutting member 62 is provided with a blade portion 92 and a head portion 94 having an aperture 96 through which the pin 56 extends for connecting the cutting member 62 to the pin 56 and thus to the first and second body members 24 and 26 of the rigid body 22. The blade portion 92 of the cutting member 62 is provided with a first or upper generally planar surface 98 and a second or lower generally planar surface 100. The lower generally planar surface 100 is spatially disposed from the upper generally planar surface 98 (FIG. 9) and the blade portion 92 of the cutting member 62 is further provided with cutting edges 102 and 104 which have a substantially V-shaped configuration with approximately equivalent inclination angles (FIG. 3).

The cutting member 64 is also provided with a blade portion 106 and a head portion 108 having an aperture 110 through which the pin 58 extends for connecting the cutting member 64 to the pin 58 and thus to the first and second body members 24 and 26 of the rigid body 22. The blade portion 106 of the cutting member 64 is provided with a first or upper generally planar surface 112 and a second or lower generally planar surface 114. The lower generally planar surface 114 is spatially disposed from the upper generally planar surface 112 and the blade portion 106 of the cutting member 64 is further provided with cutting edges 116 and 118 which have a substantially V-shaped configuration with approximately equivalent inclination angles (FIG. 3).

The cutting member 66 is provided with a blade portion 120 and a head portion 122 having an aperture 124 through which the pin 60 extends for connecting the cutting member 66 to the pin 60 and thus to the first and second body members 24 and 26 of the rigid body 22. The blade portion 120 of the cutting member 66 is provided with a first or upper generally planar surface 126 and a second or lower generally planar surface 128. The lower generally planar surface 128 is spatially disposed from the upper generally planar surface 126 and the blade portion 120 of the cutting member 66 is further provided with cutting edges 130 and 132 which have a substantially V-shaped configuration with approximately equivalent inclination angles (FIG. 3).

The cutting members 62, 64 and 66 are substantially identical in construction and each has a thickness (t) less than the distance (x) between the first and second body members 24 and 26 so that the cutting members 62, 64 and 66 are freely rotatable upon the bearing surface of the pins 56, 58 and 60 while at the same time being permitted to move axially along the bearing surface throughout the distance (x) between the first and second body members 24 and 26. That is, the blade portions 92, 106 and 120 of the cutting members 62, 64 and 66 each has a thickness (tb) and the head portions 94, 108 and 122 of the cutting members 62, 64 and 66 each have a thickness (th) wherein the thickness (th) is greater than the thickness (tb), but each of the thickness (th) and (tb) is less than the distance (x) between the first and second body members 24 and 26. In addition, each of the apertures 96, 110 and 124 formed in the head portions 94, 108 and 122 of the cutting members 62, 64 and 66 each have a diameter (ad) greater than the pin diameter (pd) of the pins 56, 58 and 60 so that upon positioning the pins 56, 58 and 60 through the apertures 96, 110 and 124 in the head portions 94, 108 and 122 of the cutting members 62, 64 and 66, the cutting members 62, 64 and 66 are permitted to rotate about and axially move along the bearing surface of the pins 62, 64 and 66 during operation of the rotary cutting apparatus 10 and thereby effect cooling of the bearing surface of the pins 62, 64 and 66 and thus substantially reduce enlargement of the apertures 96, 110 and 124 in the head portions 94, 108 and 122 of the cutting members 62, 64 and 66. Further, because of the configuration of the cutting members 62, 64 and 66 and depending upon the direction of rotation of the cutting attachment 12, either of the cutting edges, such as the cutting edges 102 and 104, of the cutting member 62 can be employed as the leading or trailing edge and such can be reversed by merely disassembling the rigid body 22 and turning the cutting member, such as the cutting member 62, upside down after the cutting attachment 12 has been removed from the rotary cutting apparatus 10.

The rigid body 22 having the cutting members 62, 64 and 66 connected thereto via the pins 56, 58 and 60, can be connected to the threaded arbor or spindle 20 of the rotary cutting apparatus 10 (FIG. 2) via connector 134 of the cutting attachment 12. As previously stated, the first and second body members 24 and 26 are substantially identical in construction with the exception that the planar first side 42 of the second connector member 26 is provided with a non-circular recess 136 which extends about the centrally disposed opening 48 in the second body member 26. As will be more fully described hereinafter, the non-circular recess 136 formed in the planar first side 42 of the second body member 26 is configured to receive a portion of the connector 134 to facilitate connection of the rigid body 22 formed from the first and second body members 24 and 26 to the threaded arbor or spindle 20 of the rotary cutting apparatus 10 by hand and without the use of tools.

Figure 8:
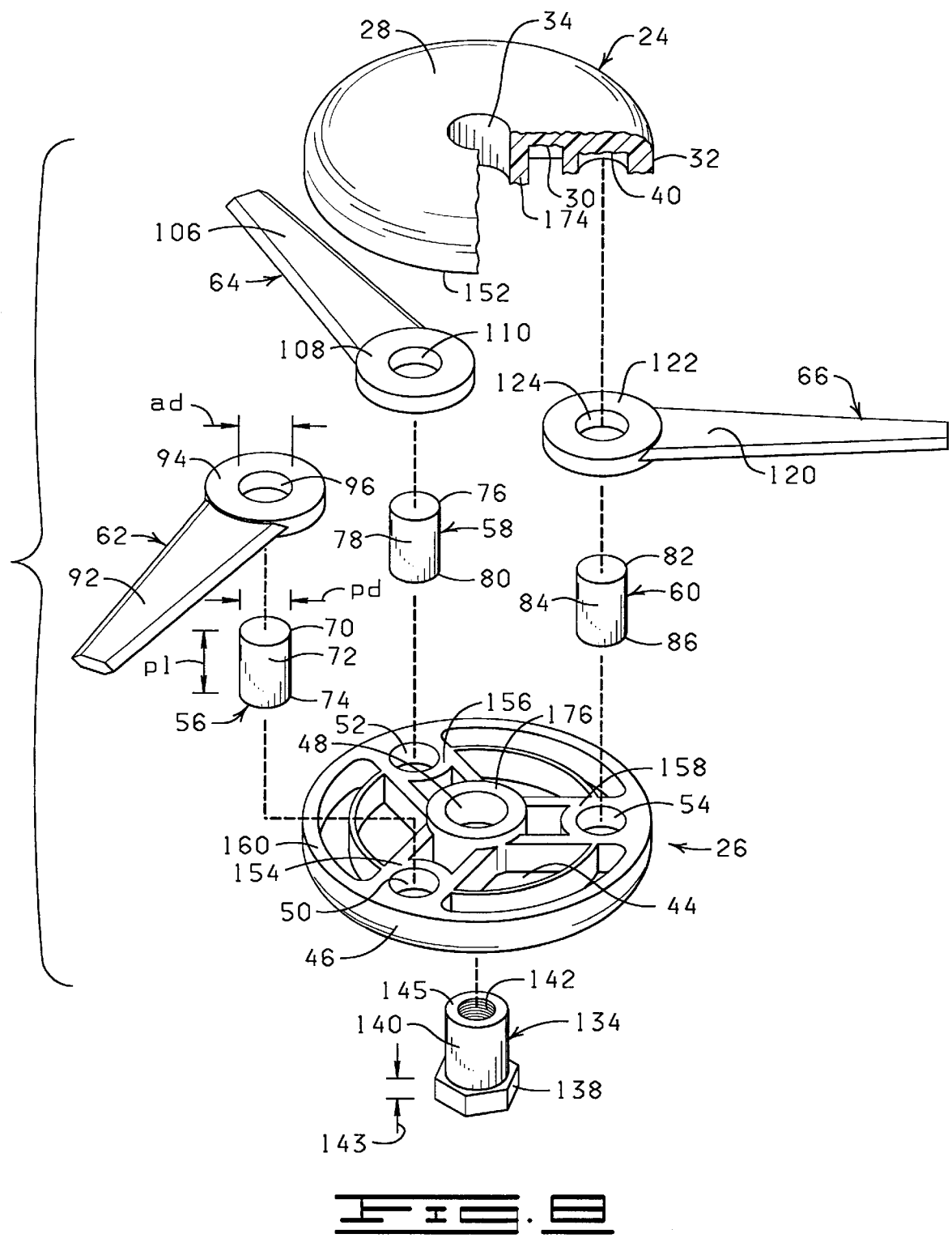
FIG. 8 is a perspective, partially broken, exploded view of the cutting attachment of the present invention.

As more clearly shown in FIGS. 8 and 9, the connector 134 is provided with a non-circular head portion 138 and a shaft or barrel portion 140 which extends substantially normal to the non-circular head portion 138. Internally disposed threads 142 extend through the non-circular head portion 138 and the shaft portion 140 substantially as shown. The non-circular head portion 138, which is provided with a configuration substantially corresponding to the configuration of the non-circular recess 136 formed about the centrally disposed opening 48 in the first side 42 of the second body member 26, has a height 143 substantially corresponding to the depth of the non-circular recess 136 so that when the connector 134 is disposed within the aligned centrally disposed openings 34 and 48 of the first and second body members 24 and 26, the non-circular head portion 138 of the connector 134 is substantially coplanar with the planar first side 42 of the second body member 26. Further, the connector 134 is provided with a length 144 such that when the connector 134 is disposed within the centrally disposed openings 34 and 48 of the first and second body members, a distal end 145 of the shaft 140 is substantially coplanar with the first ends 70, 76 and 82 of the pins 56, 58 and 60.

The diameter and pitch of the internally disposed threads 142 extending through the non-circular head portion 138 and the shaft portion 140 of the connector 134 can vary and will be dependent upon the diameter and pitch of the threaded arbor or spindle 20 of the rotary cutting apparatus 10 to which the cutting attachment 12 is to be connected. Thus, to provide the desired versatility to the cutting attachment 12 so that the cutting attachment 12 can be attached to a variety of different commercially available rotary cutting apparatus 10, the only modification to the attachment 12 required to provide such versatility is to provide the connector 138 with an internal diameter and threads of the desired pitch to correspond to the threaded arbor or shaft 20 of the rotary cutting apparatus 10.

To enhance the rigidity of the rigid body 22 of the rotary cutting attachment 12, as well as to enhance the cutting attachment 12 by providing a self-cleaning feature, the first body member 24 is provided with a plurality of radially extending bosses 146, 148 and 150 which extend from the centrally disposed opening 34 in the first body member 24 to the sidewall 32 of the first body member 24. The bosses 146, 148 and 150 of the first body member 24 each contain one of the pin receiving holes 36, 38 and 40 of the first body member 24 substantially as shown in FIG. 5. Further, in order to prevent undesired restriction of the rotation of the cutting members 62, 64 and 66 during rotation of the cutting attachment 12, the bosses 146, 148 and 150 are substantially coplanar with an edge 152 (FIG. 8) of the sidewall 32 of the first body member 24.

Similarly, the second body member 26 is provided with a plurality of radially extending bosses 154, 156, and 158 which extend from the centrally disposed opening 48 in the second body member 26 to the sidewall 46 of the second body member 26. The bosses 154, 156 and 158 each contain one of the pin receiving holes 50, 52 and 54 of the second body member 26 substantially as shown in FIGS. 7 and 8. Further, in order to prevent undesirable restriction of the rotation of the cutting members 62, 64 and 66 during rotation of the cutting attachment 12, the bosses 154, 156 and 158 are substantially coplanar with an edge 160 (FIG. 8) of the sidewall 46 of the second body member 26.

To prevent improper assembly of the first and second body members 24 and 26 by insuring that the pins 56, 58 and 60 are disposed in their respective pin receiving holes, namely, pin receiving holes 36 and 50, 38 and 52, and 40 and 54 during assembly of the cutting attachment 12, the first body member 24 is provided with pin guiding bosses 162, 164 and 166 which extend between the bosses 146, 148 and 150 substantially as shown in FIG. 5; and the second body member is provided with pin guiding bosses 168, 170 and 172 which extend between the bosses 154, 156 and 158 substantially as shown in FIG. 7. That is, the pin guiding boss 162 of the first body member 24 is an arcuate segment extending between the boss 146 and the boss 148 so as to be disposed along a radius a distance from the center of the centrally disposed opening 34 in the first body member 24 and the pin receiving holes 36 and 38 formed in the bosses 146 and 148; the pin guiding boss 164 is an arcuate segment extending between the boss 148 and the boss 150 so as to be disposed along a radius a distance from the center of the centrally disposed opening 34 in the first body member 24 and the pin receiving holes 38 and 40 formed in the bosses 148 and 150; and the pin guiding boss 166 is an arcuate segment extending between the boss 150 and the boss 146 so as to be disposed along a radius a distance from the center of the centrally disposed opening 34 in the first body member 24 and the pin receiving holes 40 and 36 formed in the bosses 150 and 146.

Similarly, the pin guiding boss 168 of the second body member 26 is an arcuate segment extending between the boss 154 and the boss 156 so as to be disposed along a radius a distance from the center of the centrally disposed opening 48 in the second body member 26 and the pin receiving holes 50 and 52 formed in the bosses 154 and 156; the pin guiding boss 170 is an arcuate segment extending between the boss 156 and the boss 158 so as to be disposed along a radius a distance from the center of the centrally disposed opening 48 in the second body member 26 and the pin receiving holes 52 and 54 formed in the bosses 156 and 158; and the pin guiding boss 172 is an arcuate segment extending between the boss 158 and the boss 154 so as to be disposed along a radius a distance from the center of the centrally disposed opening 48 in the second body member 26 and the pin receiving holes 54 and 50 formed in the bosses 158 and 154.

To enhance rigidity of the rigid body 22, especially when the cutting attachment 12 is connected to the threaded arbor or spindle 20 of the rotary cutting apparatus 10, the second side 30 of the first body member 24 is provided with a first support boss 174 which extends about the centrally disposed opening 34 of the first body member 24; and the second side 44 of the second body member 26 is provided with a second support boss 176 which extends about the centrally disposed opening 48 of the second body member 26. The first support boss 174 extends outwardly from the first body member 24 a distance approximately equal to one half (½) of the distance (x) between the first and second body members 24 and 26. Similarly, the second support boss 176 extends outwardly from the second body member 26 a distance approximately equal to one half (½) of the distance (x) between the first and second body members 24 and 26. Thus, in an assembled position of the first and second body members 24 and 26, the first support boss 174 is aligned with and disposed substantially adjacent the second support boss 176 such that the first and second support bosses 174 and 176 cooperate to support the portion of the first and second body members 24 and 26 extending about the centrally disposed openings 34 and 48 in the first and second body members 24 and 26, respectively. The first and second bosses 174 and 176, in cooperation with the pins 56, 58 and 60, maintain the first and second body members 24 and 26 in the desired spatial relation so that the cutting members 62, 64 and 66 are freely rotatable upon the bearing surface of the pins 56, 58 and 60 while at the same time being movable axially along the bearing surface of the pins 56, 58 and 60 throughout the distance (x) between the first and second body members 24 and 26.

Figure 11:
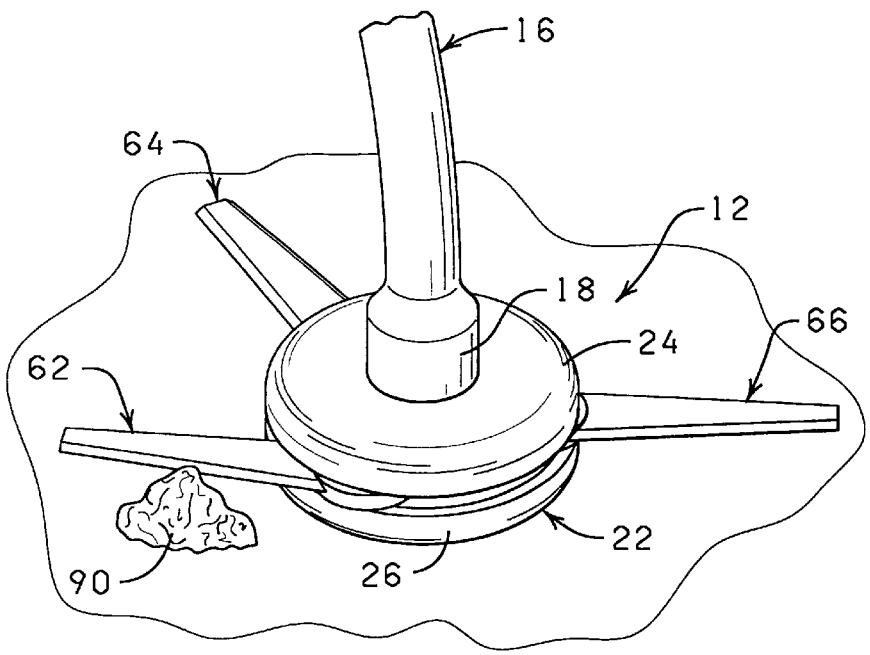
FIG. 11 is a perspective view of the cutting attachment of the present invention attached to a rotary cutting apparatus wherein one of the cutting members has been displaced temporarily due to the cutting member encountering an object during operation of the rotary cutting apparatus.

In operation and use, the cutting attachment 12 is connected to the threaded arbor or spindle 20 of the rotary cutting apparatus 10 by threading the connector 134 (which is sized and dimensioned to have the proper internal diameter and thread pitch to matingly engage with the threaded arbor or spindle 20) onto the threaded arbor or spindle 20. The cutting attachment 12 can then be operated in close proximity to the ground in the area in which vegetation is to be cut. The cutting members 62, 64 and 66 will be rotated as the cutting attachment 12 is rotated and, in the event a hard object is struck, such as by cutting member 62, the cutting member 62 will either be deflected upwardly as it moves axially along the bearing surface of the connector pin 70 if the member 62 can ride over the object or, if the object is too large, the cutting member 62 will be deflected out of the way as shown in FIG. 11. As soon as the object has been cleared, the cutting member 62 will return to its normal position by centrifugal force.

It should be noted that the configuration and smooth planar first side 42 of the second body member 26, in combination with the sidewalls 32 and 44 of the first and second body members 24 and 26 prevent the rigid body member from engaging or snagging objects encountered by the cutting attachment 12. As a result, the configuration of the first and second body members 24 and 26 enable the cutting attachment 12 to skid over objects encountered by it while permitting the cutting members 62, 64 and 66 to rotate about and move axially along the bearing surface of the pins 56, 58 and 60 and thereby effect cooling of the bearing surface of the pins 56, 58 and 60. The rotational and axial movement of the cutting members 62, 64 and 66 along the bearing surface of the pins 56, 58 and 60 substantially enhance the life of the cutting members 62, 64 and 66 by reducing heat and friction between the pins 56, 58 and 60 and the cutting members 62, 64 and 66 due to movement of the cutting members 62, 64 and 66 about and along the bearing surface of the pins 56, 58 and 60.

Further the interconnection of the first and second body members 24 and 26 to form the rigid body 22 of the cutting attachment 12 provides a self-cleaning effect so as to prevent cuttings and debris from depositing within the space formed between the first and second body members 24 and 26 and thereby interfere with the effective operation of the rotary cutting apparatus 10.

Figure 12:
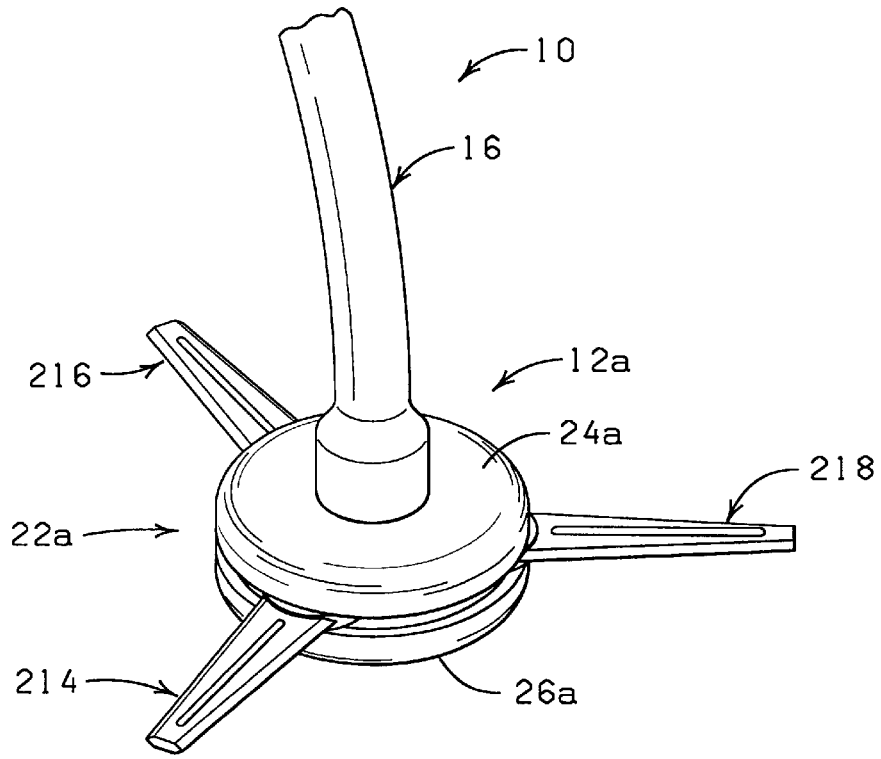
FIG. 12 is a fragmental pictorial representation of a rotary cutting apparatus having a cutting attachment of the present invention connected thereto wherein cutting members of the cutting attachment are provided with a braking assembly.

Referring now to FIG. 12, the rotary cutting apparatus 10 is illustrated having a cutting attachment 12a constructed in accordance with the present invention mounted thereon. The cutting attachment 12a is connected to the drive shaft (not shown) of the rotary cutting apparatus 10 which is housed within the frame shaft tube 16 via the threaded arbor or spindle 20 (FIG. 2) of the drive shaft of the rotary cutting apparatus 10. If desired, the rotary cutting apparatus 10 can also be provided with a debris shield (not shown) which extends about a portion of the cutting attachment 12a.

The cutting attachment 12a is provided with a rigid body 22a formed from a first body member 24a and a spatially disposed second body member 26a. A plurality of radially extending cutting members 214, 216 and 218 are rotatably connected to the rigid body 22a by pins (not shown). The rigid body 22a, the interconnection of the first and second body members 24a and 26a and the connection of the radially extending cutting members 214, 216 and 218 to the rigid body 22a, are substantially identical to the rigid body 22, the interconnection of the first and second body members 24 and 26 and the connection of the radially extending cutting member 62, 64 and 66 to the rigid body 22 herein before described in detail with reference to FIGS. 2–10. Thus, no further description of the rigid body 22a, the interconnection of the first and second body members 24a and 26a or the connection of the radially extending cutting members 214, 216 and 218 to the rigid body 22a is believed necessary. It should be noted that while the cutting attachment 12a is depicted as having three radially extending cutting members 214, 216 and 218 rotatably connected between the first and second body members 24a and 26a of the rigid body 22a, two, four or more of the radially extending cutting members can be rotatably connected between the first and second body members 24a and 26a of the rigid body 22a without departing from the inventive concept disclosed herein.

The radially extending cutting members 214, 216 and 218 are identical in construction as the radially extending cutting members 62, 64 and 66 hereinbefore described with the exceptions herein after described. Further, the cutting members 214, 216 and 218 are identical in construction and function. Thus, only the cutting member 214 will be described in detail hereinafter with reference to FIGS. 13 and 14.

The cutting member 214 is provided with a blade portion 220 and a head portion 222. The head portion 222 has an aperture 224 through which a pin (such as pin 56 of FIG. 8) extends for connecting the cutting member 214 to the first and second body members 24a and 26a of the rigid body 22a. The blade portion 220 of the cutting member 214 is provided with a first or upper generally planar surface 226 and a second or lower generally planar surface 228. The lower generally planar surface 228 is spatially disposed from the upper generally planar surface 226 and the blade portion 220 of the cutting member 214 is further provided with cutting edges 230 and 232 which have a substantially V-shaped configuration with approximately equivalent inclination angles.

The cutting member 214 is further provided with a rib member 234 disposed along at least a portion of the upper generally planar surface 226 of the blade portion 220 which functions as a brake to reduce the speed of rotation of the cutting member 214 when the cutting member 214 is rotated in response to actuation of the rotary cutting apparatus 10. One end 236 of the rib member 234 is disposed a distance 237 from the head portion 222 of the cutting member 214 so that the rib member 234 does not interfere with the rotational connection of the cutting member 214 to the rigid body 22*a* of the cutting attachment 12*a*. The rib member 234 extends along at least a portion of a longitudinally extending axis 238 of the blade portion 220 of the cutting member 214 such that a second end 240 of the rib member 234 terminates near a distal end 242 of the blade portion 220 of the cutting member 214 substantially as shown. It should be understood, however, that the second end 240 of the rib member 234 can be disposed substantially adjacent the distal end 242 of the blade portion 220 of the cutting member 214.

The height of the rib member 234 can vary widely and will depend on the amount of resistance desired to effectively obtain the desired braking action. Further, while the rib member 234 has been shown as being disposed along the upper generally planar surface 226 of the blade portion 220 of the cutting member 214, it is to be understood that the rib member 234 can be disposed along the lower generally planar surface 228 of the blade portion 220 of the cutting member 214. Further, because of the configuration of the cutting member 214 and depending upon the direction of rotation of the cutting attachment 12*a*, either of the cutting edges 230 and 232 of the cutting member 214 can be employed as the leading or trailing edge and such can be reversed by merely disassembling the rigid body 22*a* and turning the cutting member 214 upside down after the cutting attachment 12*a* has been removed from the rotary cutting apparatus 10.

Referring now to FIGS. 15 and 16, another embodiment of a cutting member 250 is illustrated. The cutting member 250 can be used in place of the cutting members 62, 64 and 66 of the cutting attachment 12 or the cutting members 214, 216 and 218 of the cutting attachment 12*a*. The cutting member 250 is provided with a blade portion 252 and a head portion 254. The head portion 254 has an aperture 256 through which a pin (such as pin 56 of FIG. 8) extends for connecting the cutting member 250 to a first and second body member of a rigid body, such as the first and second body members 24*a* and 26*a* of the rigid body 22*a*.

The blade portion 252 of the cutting member 250 is provided with a first or upper generally planar surface 258 and a second or lower generally planar surface 260. The lower generally planar surface 260 is spatially disposed from the upper generally planar surface 258 and the blade portion 252 of the cutting member 250 is further provided with cutting edges 262 and 264 which have a substantially V-shaped configuration with approximately equivalent inclination angles.

The cutting member 250 is further provided with a rib member 266 disposed along at least a portion of the upper generally planar surface 258 of the blade portion 252 and a rib member 268 disposed along at least a portion of the lower generally planar surface 260. The rib members 266 and 268 function as a brake to reduce the speed of rotation of the cutting member 250 when the cutting member 250 is rotated in response to actuation of the rotary cutting apparatus 10.

One end 270 of the rib member 266 is disposed a distance 271 from the head portion 254 of the cutting member 250 and one end (not shown) of the rib member 268 is likewise disposed a similar distance from the head portion 254 of the cutting member 250 so that the rib members 266 and 268 do not interfere with the rotational connection of the cutting member 250 to a rigid body member, such as the rigid body 22*a* of the cutting attachment 12*a*. The rib members 266 and 268 extend along at least a portion of a longitudinally extending axis 272 of the blade portion 252 of the cutting member 250 such that a second end 274 of the rib member 266 and a second end 276 of the rib member 268 terminate near a distal end 278 of the blade portion 252 of the cutting member 250 substantially as shown. It should be understood, however, that the second ends 274 and 276 of the rib members 266 and 268 can be disposed substantially adjacent the distal end 278 of the blade portion 252 of the cutting member 250.

The height of the rib members 266 and 268 can vary widely and will depend on the amount of resistance desired to effectively obtain the desired braking action. Further, because of the configuration of the cutting member 250, either of the cutting edges 262 and 264 of the cutting member 250 can be employed as the leading or trailing edge and such can be reversed by merely disassembling the rigid body to which the cutting member 250 is rotatably connected, such as the rigid body 22*a*, and turning the cutting member 250 upside down after the cutting attachment 12*a* has been removed from the rotary cutting apparatus 10.

Referring now to FIGS. 17 and 18, another embodiment of a cutting member 280 is illustrated. The cutting member 280 can be used in place of the cutting members 62, 64 and 66 of the cutting attachment 12 or the cutting members 214, 216 and 218 of the cutting attachment 12*a*. The cutting member 280 is provided with a blade portion 282 and a head portion 284. The head portion 284 has an aperture 286 through which a pin (such as pin 56 of FIG. 8) extends for connecting the cutting member 280 to a first and second body member of a rigid body, such as the first and second body members 24*a* and 26*a* of the rigid body 22*a*.

The blade portion 282 of the cutting member 280 is provided with a first or upper generally planar surface 288 and a second or lower generally planar surface 290. The lower generally planar surface 290 is spatially disposed from the upper generally planar surface 288 and the blade portion 282 of the cutting member 280 is further provided with substantially V-shaped recessed edges 292 and 294 with approximately equivalent inclination angles substantially as shown. The substantially V-shaped recessed edges 292 and 294 function as cutting edges and as a brake to reduce the speed of rotation of the cutting member 280 when the cutting member 280 is rotated in response to actuation of the rotary cutting apparatus 10. Because of the configuration of the cutting member 280, either of the substantially V-shaped recessed edges 292 and 294 of the cutting member 280 can be employed as the leading or trailing edge and such can be reversed by merely disassembling the rigid body to which the cutting member 280 is rotatably connected, such as the rigid body 22*a*, and turning the cutting member 280 upside down after the cutting attachment 12*a* has been removed from the rotary cutting apparatus 10.

Referring now to FIG. 19, a cutting attachment 12*b* of the present invention is illustrated connected to the rotary cutting apparatus 10. The connection of the cutting attachment 12b to the rotary cutting apparatus 10 is substantially identical to the attachment of the cutting attachment 12 to the rotary cutting apparatus 10 heretofore described with reference to FIG. 1. The cutting attachment 12b is illustrated as having a plurality of cutting members radially extending therefrom, such as the cutting members 62, 64 and 66. However, it should be understood that the cutting members can have the configuration of the cutting members 214, 216 and 218 of the cutting attachment 212 heretofore described with reference to FIGS. 12–14, or the configuration of the cutting member 250 heretofore described with reference to FIGS. 15 and 16, or the configuration of the cutting member 280 heretofore described with reference to FIGS. 17 and 18 without departing from the inventive concept disclosed herein.

The cutting members 62, 64 and 66 are connected to a rigid body member 22b of the cutting attachment 12b in the same manner in which the cutting members 62, 64 and 66 are connected to the rigid body member 22 of the cutting attachment 12 hereinbefore described; and the construction of the rigid body member 22b is substantially identical to that of the rigid body member 22 with the exceptions hereinafter noted.

The rigid body member 22b of the cutting attachment 12b is formed from a first body member 24b and a spatially disposed second body member 26b. The first body member 24b is provided with a substantially planar first side 28b, a second side 30b and a generally vertical sidewall 32b. A centrally disposed opening 34b is formed in the first body member 24b so as to extend between the substantially planar first side 28b and the second side 30b of the first body member 24b. The second side 30b of the first body member 24b is provided with a plurality of pin receiving holes 36b, 38b and 40b formed therein which are spaced an equal distance apart and disposed in close proximity to an outer peripheral surface of the second side 30b of the first body member 24b substantially as shown in FIG. 20.

Referring now to FIGS. 21 and 22, the second body member 26b, which is substantially a mirror image of the first body member 24b with the exceptions noted herein, is provided with a substantially planar first side 42b, a second side 44b and a generally vertical sidewall 46b. A centrally disposed opening 48b extends between the first side 42b and the second side 44b of the second body member 26b such that, in a connected position of the first and second body members 24b and 26b, the centrally disposed opening 48b in the second body member 26b is axially aligned with the centrally disposed opening 34b in the first body member 24b. The second side 44b of the second body member 26b is provided with a plurality of pin receiving holes 50b, 52b and 54b spaced an equal distance apart and disposed in close proximity to an outer peripheral surface of the second side 44b of the second body member 26b such that, in an assembled position, each of the pin receiving holes 50b, 52b and 54b in the second side 44b of the second body member 26b are aligned with one of the pin receiving holes 36b, 38b and 40b in the second side 30b of the first body member 24b. The second body member 26b is further provided with a non-circular recess 136b (shown in phantom in FIG. 21) in the first planar side 42b of the second body member 26b which is configured to receive a portion of the connector (not shown) to facilitate connection of the rigid body 22b formed from the first and second body members 24b and 26b to the threaded arbor or spindle 20 of the rotary cutting apparatus 10 by hand and without the use of tools as heretofore discussed with reference to the attachment of the cutting attachment 12 to the rotary cutting apparatus 10.

To enhance the rigidity of the rigid body 22b of the rotary cutting attachment 12b, the first body member 24b is provided with radially extending bosses 146b, 148b and 150b which extend from the centrally disposed opening 34b in the first body member 24b to the sidewall 32b of the first body member 24b. The boss 146b contains a pin receiving hole 36b, the boss 148b contains a pin receiving hole 38b and the boss 150b contains a pin receiving hole 40b substantially as shown in FIG. 20. To prevent undesired restriction of the rotation of the cutting members 62, 64 and 66 during rotation of the cutting attachment 12b, the bosses 146b, 148b and 150b are substantially coplanar with an edge 152b of the sidewall 32b of the first body member 24b.

Similarly, the second body member 26b is provided with a plurality of radially extending bosses 154b, 156b, and 158b which extend from the centrally disposed opening 48b in the second body member 26b to the sidewall 46b of the second body member 26b. The boss 154b contains a pin receiving hole 50b, the boss 156b contains a pin receiving hole 52b and the boss 158b contains a pin receiving hole 54b substantially as shown in FIGS. 21 and 22. To prevent undesirable restriction of the rotation of the cutting members 62, 64 and 66 during rotation of the cutting attachment 12b, the bosses 154b, 156b and 158b are substantially coplanar with an edge 160b (FIG. 22) of the sidewall 46b of the second body member 26b.

To insure proper alignment of the first and second body members 24b and 26b during the assembly of the rigid body 22b, the first body member 24b is provided with a plurality of pin guiding bosses 162b, 164b and 166b which extend between the bosses 146b, 148b and 150b substantially as shown in FIG. 20; and the second body member 26b is provided with a plurality of pin guiding bosses 168b, 170b and 172b which extend between the bosses 154b, 156b and 158b substantially as shown in FIGS. 21 and 22. That is, the pin guiding boss 162b of the first body member 24b is an arcuate segment extending between the boss 146b and the boss 148b so as to be disposed along a radius a distance from the center of the centrally disposed opening 34b in the first body member 24b and the pin receiving holes 36b and 38b formed in the bosses 146b and 148b; the pin guiding boss 164b is an arcuate segment extending between the boss 148b and the boss 150b so as to be disposed along a radius a distance from the center of the centrally disposed opening 34b in the first body member 24 and the pin receiving holes 38 and 40 formed in the bosses 148b and 150b; and the pin guiding boss 166b is an arcuate segment extending between the boss 150b and the boss 146b so as to be disposed along a radius a distance from the center of the centrally disposed opening 34b in the first body member 24b and the pin receiving holes 40b and 36b formed in the bosses 150b and 146b.

Similarly, the pin guiding boss 168b of the second body member 26b is an arcuate segment extending between the boss 154b and the boss 156b so as to be disposed along a radius a distance from the center of the centrally disposed opening 48b in the second body member 26b and the pin receiving holes 50b and 52b formed in the bosses 154b and 156b; the pin guiding boss 170b is an arcuate segment extending between the boss 156b and the boss 158b so as to be disposed along a radius a distance from the center of the centrally disposed opening 48b in the second body member 26b and the pin receiving holes 52b and 54b formed in the bosses 156b and 158b; and the pin guiding boss 172b is an arcuate segment extending between the boss 158b and the boss 154b so as to be disposed along a radius a distance from the center of the centrally disposed opening 48b in the second body member 26b and the pin receiving holes 54b and 50b formed in the bosses 158b and 154b.

To enhance rigidity of the rigid body 22b, especially when the cutting attachment 12b is connected to the threaded arbor or spindle of the rotary cutting apparatus 10, the second side 30b of the first body member 24b is provided with a first support boss 174b which extends about the centrally disposed opening 34b of the first body member 24b; and the second side 44b of the second body member 26b is provided with a second support boss 176b which extends about the centrally disposed opening 48b of the second body member 26b. The first support boss 174b extends outwardly from the first body member 24b a distance approximately equal to one half (½) of the distance x (hereinbefore described) between the first and second body members 24b and 26b. Similarly, the second support boss 176b extends outwardly from the second body member 26b a distance approximately equal to one half (½) of the distance x between the first and second body members 24b and 26b. Thus, in an assembled position of the first and second body members 24b and 26b, the first support boss 174b is aligned with and disposed substantially adjacent the second support boss 176b such that the first and second support bosses 174b and 176b cooperate to support the portion of the first and second body members 24b and 26b extending about the centrally disposed openings 34b and 48b in the first and second body members 24b and 26b, respectively. The first and second bosses 174b and 176b, in cooperation with pins, such as the pins 56, 58 and 60 hereinbefore described, maintain the first and second body members 24b and 26b in the desired spatial relation so that the cutting members 62, 64 and 66 are freely rotatable upon the bearing surface of the pins while at the same time being movable axially along the bearing surface of the pins throughout the distance (x) between the first and second body members 24b and 26b.

The rigid body 22b of the cutting attachment 12b is further provided with a brake assembly 300 for reducing the speed of rotation of the rigid body 22b, and thus the cutting members 62, 64 and 66 when the rigid body 22b is rotated in response to actuation of the rotary cutting apparatus 10. The brake assembly 300 comprises a plurality of radially extending rib members 302, 304 and 306 disposed between the radially extending bosses 146b, 148b and 150b of the first body member 24b and a plurality of radially extending rib members 308, 310 and 312 disposed between the radially extending bosses 154b, 156b and 158b of the second body member 26b. The rib members 302, 304 and 306 of the first body member 24b extend from the first support boss 174b disposed about the centrally disposed opening 34b in the first body member 24b to the sidewall 32b of the first body member 24b and are substantially coplanar with the edge 152b of the sidewall 32b of the first body member 24b and thus the bosses 146b, 148b and 150b. Similarly, the rib members 308, 310 and 312 of the second body member 26b extend from the second support boss 176b disposed about the centrally disposed opening 48b in the second body member 26b to the sidewall 46b of the second body member 26b and are substantially coplanar with the edge 160b of the sidewall 46b of the second body member 26b and thus the bosses 154b, 156b and 158b substantially as shown in FIG. 22.

It should be understood that the cutting attachment 12b is assembled in substantially the same manner as the cutting attachment 12 hereinbefore described in detail with reference to FIGS. 2–8. Further, while the cutting attachment 12b having the brake assembly 300 has been illustrated as having the cutting members 62, 64 and 66, one can readily employ, in place of the cutting members 62, 64 and 66, the cutting members 214, 216 and 218, or a plurality of the cutting member 250, or a plurality of the cutting members 280 to enhance the reduction of the speed of rotation of the rigid body 22b, and thus the speed of rotation of the cutting members, when same are caused to rotate in response to actuation of the rotary cutting apparatus 10.

Changes may be made in the construction and the operation of the various parts, elements and assemblies described herein and the steps or the sequence of steps of the methods described herein without departing from the spirit and the scope of the invention as defined in the following claims.

I claim:

1. A cutting attachment for a rotary cutting apparatus comprising:

a rigid body comprising a first body member and a spatially disposed second body member, the first body member having a first side, a second side, and a centrally disposed opening extending therethrough, the second side of the first body member having a plurality of pin receiving holes formed therein an equidistance apart, the second body member having a first side, a second side, and a centrally disposed opening extending therethrough, the second side of the second body member having a plurality of pin receiving holes formed therein an equidistance apart such that each of the pin receiving holes in the second side of the second body member is alignable with one of the pin receiving holes in the second side of the first body member;

a plurality of pins for connecting the first and second body members and for maintaining at least a peripheral portion of the first and second body members in a spatially disposed relationship, each pin having a first end, a medial portion defining a bearing surface and a second end, each of the pins having a pin length (pl) and a pin diameter (pd) such that upon disposing the first end of each of the pins in one of the pin receiving holes in the second side of the first body member and disposing the second end of such pins in one of the pin receiving holes in the second side of the second body member the first and second body members are spatially disposed a pre-determined distance (x) apart whereby the bearing surface of each of the pins is exposed in the space provided between the first and second body members of the rigid body;

a plurality of cutting members, each cutting member comprising a blade portion and a head portion having an aperture extending therethrough such that one of the pins is disposed through the aperture in the head portion of each of the cutting members for rotatably connecting one of the cutting members to each of the pin members and to the rigid body, the blade portion of each of the cutting members having a thickness (tb) less than the distance (x) between the first and second body member and the head portion of each of the cutting members having a thickness (th) less than the distance (x) between the first and second body member, the aperture in the head portion having a diameter (ad) greater than the pin diameter (pd) of the pin whereby each of the cutting members is permitted to rotate about and axially move along the bearing surface of the pin to which the cutting member is connected during operation of the rotary cutting device to effect cooling of the bearing surface of the pins and thereby substantially reduce enlargement of the apertures in the head portions of the cutting members due to rotational movement of the head portions of the cutting members about the bearing surfaces of the pins and axial movement of the head portions of the cutting members along the bearing surfaces of the pins;

pin guiding boss means disposed on the second side of the first and second body members for enhancing alignment of the pins with the pin receiving holes in the first and second body members and thereby insuring proper connection of the first and second body members via the pins;

brake means for reducing the speed of rotation of the cutting members; and means for attaching the rigid body of the cutting attachment to the rotary cutting device.

2. The cutting attachment for a rotary cutting apparatus of claim 1 wherein the pin guiding boss means comprises a plurality of arcuate segments, one of each of the arcuate segments extending between each of the pin receiving holes of the first and second body members along a radius a distance from the center of the centrally disposed opening in the first and second body members.

3. The cutting attachment for a rotary cutting apparatus of claim 1 further comprising a plurality of radially extending bosses disposed along the second side of the first and second body members to reinforce and enhance the rigid body formed of the first and second body members, each of the radially extending bosses containing one of the pin receiving holes.

4. The cutting attachment for a rotary cutting apparatus of claim 3 wherein the brake means comprises a radially extending rib member disposed along the second side of the first and second body members such that at least one rib member is positioned between adjacently disposed radially extending bosses.

5. The cutting attachment for a rotary cutting apparatus of claim 1 wherein the brake means comprises radially extending rib members disposed on at least one of the first and second body members of the rigid body.

6. The cutting attachment for a rotary cutting apparatus of claim 1 wherein the blade portion of each cutting member is characterized as having an upper surface and a spatially disposed lower surface and wherein the brake means comprises a rib member extending longitudinally along at least a portion of at least one of the upper and lower surfaces of the blade portion of the cutting elements.

7. The cutting attachment for a rotary cutting apparatus of claim 1 wherein the blade portion of each cutting member is characterized as having an upper surface, a lower surface, a leading edge and a trailing edge and wherein the braking means extends from the upper surface of the blade portion, or the lower surface of the blade portion or from the upper and lower surfaces of the blade portion.

8. The cutting attachment for a rotary cutting apparatus of claim 7 wherein the braking means comprises a rib member extending from near the head portion of the substantially rigid body member along at least a portion of the longitudinally extending axis of the blade portion.

9. The cutting attachment for a rotary cutting apparatus of claim 1 wherein the blade portion of each cutting member is characterized as having an upper surface, a lower surface, a leading edge and a trailing edge and wherein the braking means comprises a substantially V-shaped recess formed in at least the leading edge of the blade portion of each cutting member.

10. The cutting attachment for a rotary cutting apparatus of claim 1 further comprising:

a first support boss formed on the second side of the first body member so as to extend about the centrally disposed opening in the first body member; and a second support boss formed on the second side of the second body member so as to extend about the centrally disposed opening in the second body member, the first support boss extending outwardly from the first body member a distance of approximately one-half (½) the distance x between the first and second body members, the second support boss extending outwardly from the second body member a distance of approximately one-half (½) the distance x such that in an assembled position the first and second support bosses are substantially adjacently disposed and cooperate with the pins to maintain the first and second body members in the desired spatial relation to permit the cutting members to rotate about and axially move along the bearing surfaces defined by the pins.

11. The cutting attachment for a rotary cutting apparatus of claim 10 wherein the brake means comprises a radially extending rib member disposed along the second side of the first and second body members such that at least one rib member is positioned between adjacently disposed radially extending bosses.

12. The cutting attachment for a rotary cutting apparatus of claim 10 wherein the brake means comprises radially extending rib members disposed on at least one of the first and second body members of the rigid body.

13. The cutting attachment for a rotary cutting apparatus of claim 10 wherein the blade portion of each cutting member is characterized as having an upper surface and a spatially disposed lower surface and wherein the brake means comprises a rib member extending longitudinally along at least a portion of at least one of the upper and lower surfaces of the blade portion of the cutting elements.

14. The cutting attachment for a rotary cutting apparatus of claim 10 wherein the blade portion of each cutting member is characterized as having an upper surface, a lower surface, a leading edge and a trailing edge and wherein the braking means extends from the upper surface of the blade portion, or the lower surface of the blade portion or from the upper and lower surfaces of the blade portion.

15. The cutting attachment for a rotary cutting apparatus of claim 14 wherein the braking means comprises a rib member extending from near the head portion of the substantially rigid body member along at least a portion of the longitudinally extending axis of the blade portion.

16. The cutting attachment for a rotary cutting apparatus of claim 10 wherein the blade portion of each cutting member is characterized as having an upper surface, a lower surface, a leading edge and a trailing edge and wherein the braking means comprises a substantially V-shaped recess formed in at least the leading edge of the blade portion of each cutting member.

17. The rotary cutting apparatus of claim 1 wherein the rotary cutting apparatus is provided with a threaded arbor and wherein the first side of the second body member is provided with a non-circular recess which extends about the centrally disposed opening in the second body member and wherein the means for attaching the rigid body of the cutting attachment to the rotary cutting apparatus comprises:

a connector having a non-circular head portion and a shaft portion having a distal end, the connector having an internally threaded bore adapted to threadably receive the threaded arbor of the rotary cutting apparatus, the non-circular head portion substantially conforming to the configuration of the non-circular recess in the second body member and adapted to be disposed within the non-circular recess of the second body member, the shaft portion of the connector disposed within the centrally disposed opening in the first and second body members, the connector having a length such that, in an assembled position, the distal end of the shaft portion is substantially coplanar with the first end of the pins connected to the first body member.

18. The cutting attachment for a rotary cutting apparatus of claim 17 further comprising:

a first support boss formed on the second side of the first body member so as to extend about the centrally disposed opening in the first body member; and a second support boss formed on the second side of the second body member so as to extend about the centrally disposed opening in the second body member, the first support boss extending outwardly from the first body member a distance of approximately one-half (½) the distance x between the first and second body members, the second support boss extending outwardly from the second body member a distance of approximately one-half (½) the distance x such that in an assembled position the first and second support bosses are substantially adjacently disposed and cooperate with the pins to maintain the first and second body members in the desired spatial relation to permit the cutting members to rotate about and axially move along the bearing surfaces defined by the pins.

19. The cutting attachment for a rotary cutting apparatus of claim 18 wherein the brake means comprises radially extending rib members disposed on at least one of the first and second body members of the rigid body.

20. The cutting attachment for a rotary cutting apparatus of claim 18 wherein the blade portion of each cutting member is characterized as having an upper surface and a spatially disposed lower surface and wherein the brake means comprises a rib member extending longitudinally along at least a portion of at least one of the upper and lower surfaces of the blade portion of the cutting elements.

21. The cutting attachment for a rotary cutting apparatus of claim 18 wherein the blade portion of each cutting member is characterized as having an upper surface, a lower surface, a leading edge and a trailing edge and wherein the braking means extends from the upper surface of the blade portion, or the lower surface of the blade portion or from the upper and lower surfaces of the blade portion.

22. The cutting attachment for a rotary cutting apparatus of claim 21 wherein the braking means comprises a rib member extending from near the head portion of the substantially rigid body member along at least a portion of the longitudinally extending axis of the blade portion.

23. The cutting attachment for a rotary cutting apparatus of claim 18 wherein the blade portion of each cutting member is characterized as having an upper surface, a lower surface, a leading edge and a trailing edge and wherein the braking means comprises a substantially V-shaped recess formed in at least the leading edge of the blade portion of each cutting member.

* * * * *